(No Model.)
S. E. NUTTING.
DYNAMO ELECTRIC MACHINERY.
No. 393,849. Patented Dec. 4, 1888.
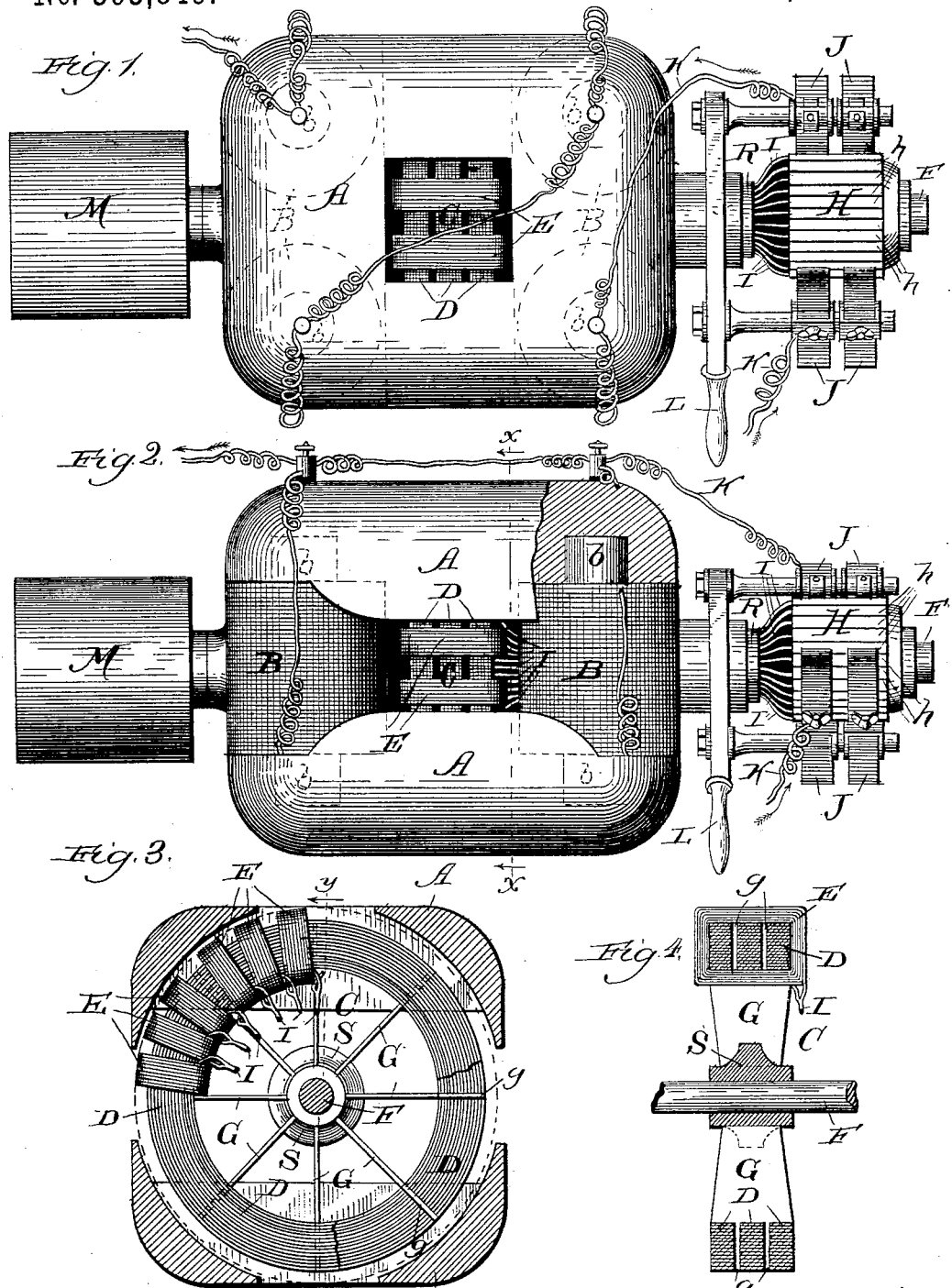
Witnesses:
Chas. E. Gaylord
Chas. E. Gorton
Inventor:
Samuel E. Nutting
By Banning & Banning
Att'ys

UNITED STATES PATENT OFFICE.

SAMUEL E. NUTTING, OF CHICAGO, ILLINOIS.

DYNAMO-ELECTRIC MACHINERY.

SPECIFICATION forming part of Letters Patent No. 393,849, dated December 4, 1888.

Application filed November 18, 1887. Serial No. 255,549. (No model.)

*To all whom it may concern:*

Be it known that I, SAMUEL E. NUTTING, a citizen of the United States, residing at Chicago, Illinois, have invented certain new and useful Improvements in Dynamo-Electric Machines or Motors, of which the following is a specification.

The object of my invention is to make a dynamo-electric machine or motor that will remain cool in action, be economical in construction and operation, compact in form, and that will require the smallest amount of wire for the field-coils; and my invention consists in the features and details of construction hereinafter described and claimed.

In the drawings, Figure 1 is a plan view of my improved electric machine or motor. Fig. 2 is a side elevation of the same. Fig. 3 is a transverse section taken through the line $x\ x$ of Fig. 2; and Fig. 4 is a section of the armature, taken through the line $y\ y$ of Fig. 3.

In the drawings, A A represent the two pole-pieces of the field-magnet coils; B B, two of the field-magnet coils; C, the armature; D, the band-iron composing a part of the armature E, coils of wire encircling the band-iron and composing another part of the armature; F, the shaft on which the armature revolves; G, spokes or projecting arms on which the band-iron is wound; H, the commutator, composed of sections or segments $h$; I, the wires leading from the coiled wires E of the armature to the various segments of the commutator; J, the brushes, which bear against the commutator and connect the armature-coils through the wires I with the circuit; K, the wire composing the circuit, which leads from one pair of brushes around through the circuit in the usual way and back to the other pair of brushes; L, a lever for shifting the position of the brushes on the commutator; M, a pulley by which power is applied to rotate the shaft and the armature; R, a sleeve encircling the shaft F, and S a hub for the center of the armature.

In making my improved dynamo-electric machine or motor I construct four field-magnet coils (shown in dotted lines in Fig. 1) by coiling wire around cores $b$, made of wrought-iron or other suitable material. Two of these field-magnet coils are shown in Fig. 2, and one end of the core $b$ is also shown in that figure. These field-magnet coils are made of such height and dimensions as the constructer may desire, reference being had to the size and proportions of the machine in which they are employed. The construction of these field-magnet coils is in the ordinary and well-known way, except that I project the ends of the cores beyond the coils, so that they may extend into the iron of the pole-pieces. As shown in Fig. 2, I allow these ends of the cores to extend but a part of the way through the pole-pieces instead of clear through, as I have found that where the cores extend entirely through the pole-pieces a loss of magnetic action occurs. But two of these field-magnet coils are shown in Fig. 2, which is a side elevation of the machine. It will be understood that there are two others just like them in construction, location, and arrangement at the other side of the machine. These four field-magnet coils are preferably used in pairs and are interposed between pole-pieces A A, made of cast iron or other suitable material and adapted to receive the projecting ends of the cores. For this purpose they should be cast or made with sockets to receive the ends of the cores $b$, as shown in Fig. 2. These pole-pieces are preferably made of such size and thickness that they will form when in place on the projecting ends of the cores of the magnet-coils a square or cube with its edges rounded off, as shown in the drawings. Their sockets or holes to receive the projecting ends of the cores are preferably near the corners, so that when the field-magnet coils and the pole-pieces are placed together in position for use the four field-magnet coils will be near the four corners of the machine, so that there will be a space between them both lengthwise and crosswise of the machine at right angles to each other, but preferably far enough from the corners to permit the pole-pieces to fully cover or inclose their ends.

In winding the field-magnet coils and connecting them with the circuit care should be taken to wind them to the same resistance—that is, with the same quantity of wire—and direct the current in that direction which will make the polarity of the coils the same, so that all the ends of the cores which enter one pole-piece shall be of the same polarity. In this way each of the pole-pieces forms one pole for the four ends of the cores with which it is connected.

I make an armature by mounting, preferably, a number of spokes or arms on a central hub, S, which is provided with a hole through which the shaft F passes. The hub with its spokes or arms should be of non-magnetic material and fixed on the shaft F so as to rotate with it. The ends of the spokes or arms G are preferably provided with projecting fingers $g$, so as to divide their ends into spaces, as shown in Fig. 4. I have shown two projecting fingers dividing the ends of the spokes or arms into three parts, though it is obvious that a greater or a less number can be employed, so as to form as many divisions as may be desired; or, if preferred, the hub and spokes may be made out of one solid interior or center piece of non-magnetic material and the other portions of the armature built upon it; but I prefer to make the hub and spokes as above described, as they allow the air to circulate freely through them. I take, preferably, band-iron and coil it around the ends of the spokes or solid interior or center piece, where that is used, so as to form a "ring," as it may be termed, as shown in Fig. 3. The band-iron should be wound round and round until as great a thickness is secured as may be required. The fingers $g$ divide this ring into different divisions, so that there is a space between the rings of band-iron, as shown by an inspection of Figs. 1 and 2 of the drawings. As before said, as many fingers $g$ may be employed as desired, which will give a corresponding number of rings of band-iron with spaces between them. This permits air to circulate between the rings of band-iron and greatly assists in ventilating them and preventing them from becoming heated when in operation. In building up these rings of band-iron the iron layers may be placed one upon another without any insulating material between them, or insulation may be used, if preferred. The hub and spokes or center piece with the rings of band-iron built thereon form what I term, for convenience, the "armature-core."

After the rings of band-iron have been built up on the ends of the spokes or arms to the required thickness, I take insulated wire of any suitable kind and wind it around the rings of band-iron forming the outer portion of the core in coils E, as shown in Fig. 3. As the outer circumference of the core-rings D is larger than the inner circumference, I am able to make the coils of wire E so that they will touch at their inner sides while not touching at their outer. Between each two coils a space will thus be left, as shown in Fig. 3, instead of being filled with iron projecting into them to make the circumference smooth or flush all round, as is usually done. The wire having these coils can be carried from one coil to another, as shown in Fig. 3, so that all of the coils E will be connected together. The spaces left between these coils assist in ventilating the armature and preventing its becoming heated in action. The armature-core with the coils E wound around its rings of band-iron constitutes the complete armature.

The ends of the wire which I have marked I can all be carried along the shaft F to the commutator H. This commutator is mounted on the same shaft, F, in such a way as to revolve with it and the armature, as shown in Fig. 2. The shaft F is mounted on suitable bearings or boxes, which need not be described, so as to pass lengthwise through the center of the machine between the field-magnet coils. By placing these coils near the corners, as above explained, I secure a space between them lengthwise of the machine, through which this shaft may be located and through which it may operate. I have provided it with a pulley, M, so that power may be applied to cause it to rotate. The pole-pieces A A are cast with a passage or channel in them for the armature, as shown in Fig. 3, preferably cutting through them, so that the armature appears from the top, as shown in Fig. 1. As the armature revolves in this channel, a large portion of its circumference is constantly surrounded to a great extent in each field by the iron of the pole-pieces and by the field-coils, so that divergence or leaking of the magnetic power is practically prevented. The sides of these pole-pieces somewhat approach each other, but still leave a space through which the armature appears at the sides of the machine, as shown in Fig. 2. These features will be readily understood by referring to the sectional view shown in Fig. 3, where it will appear from the dotted lines that the diameter of the armature is practically the same as the diameter of the machine when put together, so that the armature in its revolutions comes to the edge or surface of the machine at its four sides. This cutting through the pole-pieces at the top and bottom, as shown in Figs. 1 and 3, which I prefer, makes the parts more compact in form and greatly assists and facilitates the ventilation, while detracting nothing from the magnetic action of the machine. The armature is located on the shaft at such a position as to go between the field-magnet coils and occupy the space crosswise of the machine secured by the location of these coils near the corners of the pole-pieces. In this way the shaft and the armature occupy spaces crossing each other between the field-magnet coils.

The location of the armature between the two pairs of field-magnet coils and close to them, as above described, prevents a loss of magnetic power and reduces the quantity of wire required in the construction of the field-magnet coils.

As before said, the commutator is located on the same shaft that rotates the armature, as shown in Figs. 1 and 2. The wires I, leading from the coils E of the armature, pass along the shaft F, and preferably between it and the sleeve R, the end of which appears in Figs. 1 and 2. The wires I connect with the segments of the commutator, as shown in these figures. Brushes J are arranged to bear against the commutator, and a lever, L, may be employed to shift their position on the commutator. The brushes are preferably arranged in pairs in the usual way. The wire K leads from one pair of brushes around the field-coils and on through the circuit back to the other pair of brushes, as shown in Figs. 1 and 2.

By constructing the parts as above described I am able to obviate a number of objections that have heretofore existed in dynamo-electric machinery and secure a number of advantages that have not, so far as I know, ever yet been obtained. In my machine there are no projecting limbs or pieces, as in the ordinary machines. The two pole-pieces are identical in size and construction, so that they can be readily and economically cast. The armature is readily accessible for repairs by removing the upper pole-piece. The machine is compact in size, neat in appearance, and not liable to get out of order. The armature is thoroughly ventilated, so that overheating in action is prevented, and the greatness of the diameter of the armature as compared with the size of the machine enables it to run at a lower rate of speed than would otherwise be necessary to do the work.

What I regard as new, and desire to secure by Letters Patent, is—

1. In a dynamo-electric machine, an armature comprising a non-magnetic hub with non-magnetic spokes or arms extending therefrom and terminating in fingers with spaces between, rings of band-iron wound thereon in the spaces between the fingers, whereby each ring is separated from the others, and coils of insulated wire wound transversely around the rings of band-iron with spaces between the coils, substantially as described.

2. In a dynamo-electric machine, the combination of upper and lower pole-pieces, channels in such pole-pieces cutting through the surface at their deepest point, two pairs of field-magnet coils interposed between the pole-pieces at the sides of the channels, and an armature revolving in the channels of the pole-pieces between the pairs of field-magnet coils and appearing at each of the four sides of the pole-pieces, substantially as described.

3. In a dynamo-electric machine, the combination of upper and lower pole-pieces and two pairs of field-magnet coils interposed between the pole-pieces near their four corners with their ends inclosed in sockets in the pole-pieces, substantially as described.

SAMUEL E. NUTTING.

Witnesses:
J. W. DYRENFORTH,
M. F. FAIRBANKS.